July 11, 1967     R. E. STEWART     3,330,522

VIBRATION ISOLATING MOUNT

Filed Dec. 10, 1965

INVENTOR.
ROSS E. STEWART

BY *Edward S. Keel*

ATTORNEY

United States Patent Office 3,330,522
Patented July 11, 1967

3,330,522
VIBRATION ISOLATING MOUNT
Ross E. Stewart, Norwalk, Ohio, assignor to Clevite Corporation, a corporation of Ohio
Filed Dec. 10, 1965, Ser. No. 512,910
6 Claims. (Cl. 248—358)

This invention relates generally to a vibration isolating mount particularly of the flexible or rubber type.

The need in industrial applications for isolating vibrations is well known and quite extensive. The type of mounts herein under consideration are adapted to be employed for instance as motor, or instrument, mounts and can be used either in compression, tension, axial or tangential shear. A mount of this type is shown in U.S. Patent 2,965,349, of which this invention is an improvement. For the various structural modifications of the mount body reference should be had to this patent and, to this extent the disclosure of this patent is incorporated herein by this reference.

The improvement in the vibration isolating mount concerns the manner in which this mount is fastened or otherwise attached to the workpieces which are to be vibration isolated. In the prior art referred to above, a ring, or more broadly, a body of flexible material is provided with two studs made of a rigid, metallic, material which extends outwardly in diametrically opposite directions. The stud is secured to the ring, or body, by means of metal retaining shoulders which hold the flexible material therebetween in axial compression. The other end is suitably threaded so that it may be attached to the workpiece.

The assembly of the mount itself as well as the attachment thereof to the workpieces requires a considerable number of working steps. Inasmuch as these devices are frequently utilized in areas of mass production, it will be appreciated, that any simplification of such a mount and more specifically, any elimination of any one of such assembly steps will result in considerable savings.

It is therefore the primary object of this invention to provide a more simplified, inexpensive, flexible vibration isolating mount.

It is a more specific object of this invention to provide a mount of the type herein under consideration in which the fastening device is integrally cast, or molded, with the main body of the mount to obviate the need for connecting these two elements.

It is a still further object of this invention to eliminate the bolt and nut type of arrangement for securing the mount to the workpiece.

It is a still further object of this invention to provide a vibration isolating mount in which the means for attaching the mount to the workpieces constitutes an integral part of the mount itself.

One aspect of the present invention resides in the provision of a vibration isolating mount for resiliently connecting a first and a second workpiece disposed in spaced relation, each workpiece having a coaxially aligned aperture. The mount itself is constituted of a body of resilient, rubber-like, material and includes two elongated studs which extend outwardly from the body in substantially diametrically opposite directions. The studs are formed integrally with the body and each stud has a first portion which is located adjacent to the body and has a diameter substantially greater than the diameter of each workpiece aperture; and a second portion which is located contiguous to the first and which has a diameter smaller than the diameter of the workpiece aperture. Each of these two studs are adapted to be pulled through one of the workpiece apertures in response to axial elongation or stretching thereof for placing the workpiece about the first portion and being retained in that position by the circumferential compression which is now exerted therebetween. In the preferred embodiment a circumferential bead or shoulder is formed on both ends of each first portion for embracing the individual workpiece.

For a better understanding of the present invention, together with other and further objects thereof, reference is had to the following description taken in connection with the accompanying drawings, and its scope will be pointed out in the appended claims.

Figure 1:
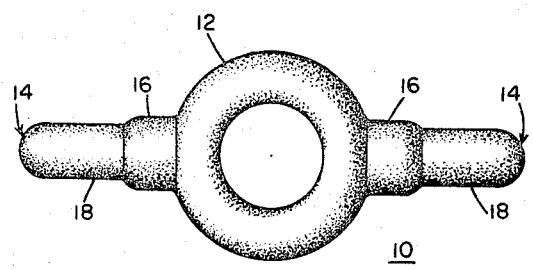
FIGURE 1 is a plan view showing the vibration isolating mount in accordance with this invention.
Figure 2:
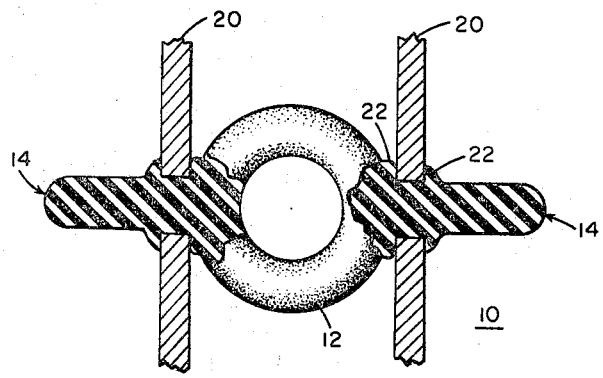
FIGURE 2 is a view similar to FIGURE 1 showing the mount in assembled condition and cross sectioned in part to illustrate the relationship of the stud to the workpiece after assembly.

Referring now to the drawing, there is shown in FIGURES 1 and 2 a flexible mount 10 in which, for exemplary purposes, the main body of flexible material forms a ring-like structure 12. Two elongated studs 14 extend outward from the periphery of the ring-like structure 12 in substantially diametrically opposite directions and coaxial alignment. The ring structure as well as the integrally formed pair of studs 14 are composed, preferably, of rubber or other flexible material which will serve the function as hereinafter further delineated.

Each stud 14 is provided with an enlarged diameter portion 16 and a relatively smaller diameter portion 18. The portion 16 is slightly tapered towards the end of the stud. In order to secure the mount to the workpieces 20 of a support or platform, which are provided with suitable apertures, the enlarged portion 16 must have a diameter which is substantially greater than the diameter of the workpiece. On the other hand, for ease of assembly, the stud portion 14 should have a diameter which is at least smaller than the diameter of the workpiece aperture.

The mount is assembled by axially elongating the stud 14 to reduce the diameter of the enlarged portion 16 so that the stud may be readily pulled through the workpiece until the workpiece is suitably positioned on the enlarged portion at which point the stretching, or axial elongation is terminated so that the workpiece 20 becomes securely seated by virtue of the circumferential compression which is now exerted therebetween.

In the preferred embodiment, the stud, or at least the enlarged portion 16 thereof, is composed of a material which permits a distention of part of portion 16 so that upon juxtaposing the workpiece 20 upon the portion 16 sufficient material is displaced to form a circumferential retaining bead or shoulder 22 to hold the workpiece as the workpiece is pushed against the ring or stop. The bead 22 securely embraces the workpiece therebetween and prevents axial movement.

The assembly of this device may be facilitated by the use of a lubricant. Ordinarily, the parts cannot become disengaged without again axially elongating the stud member 16 to permit a release of the workpiece. Here again a lubricant will facilitate such operation.

Once the part has been assembled, it may be desirable, in some instances, to cut off, or otherwise eliminate, the protruding end portion of the stud 16. However, a sufficient axial length is retained as an aid to hold the bead 22 in place.

It will be appreciated that numerous modifications of the ring-like structure 12 are possible. For such modifications reference is again made to the above noted patent.

Figure 3:
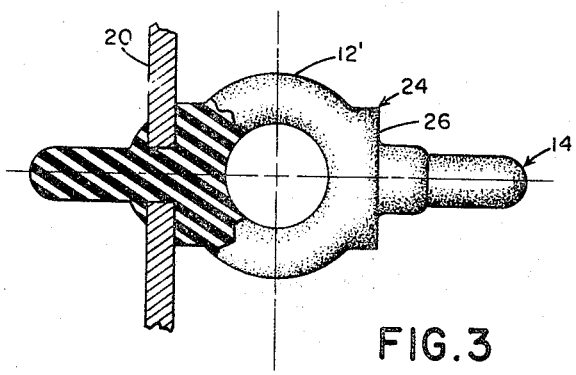
FIGURE 3 is a view similar to FIGURE 2, showing a further modification of subject invention with and without the workpiece in place.

A further modification of the invention is shown in FIGURE 3. Herein, the annular mount body 12' is provided with a shoulder or boss 24 in which the base plane 26 is flat and passes approximately through the point of tangency of the annular mount 12'. The boss is elongated in a direction approximately coaxial with the center axis of the mount. The flat base plane 26 of the boss 24 abuts against the workpiece 20 to prevent excessive movement of the workpiece in a primarily radial direction relative to the stud member 14. For the same reason the workpiece 20 may also be placed directly against the annular body 12, thereby eliminating the retaining shoulder 22 located between the mount body and the workpiece.

To increase the holding power of the stud, while retaining an appreciable degree of softness in the mount structure, the device may be molded of dual hardness rubber. In this case the mount body 12 is composed of rubber-like material which is relatively soft and the stud 14 is made of a material which is comparatively appreciably harder. The structure of the mount, as above described, remains the same in all respects although the dimensions of the retaining shoulder 22 will vary with the degree of hardness of the material for the stud member 14.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A vibration isolating mount for resiliently connecting a first and a second workpiece disposed in spaced relation and each having an aperture coaxially aligned with the other, comprising: a ring-like body of resilient, rubber-like, material including two elongated studs extending outward from the circumference of said body in substantially diametrically opposite directions, said studs being formed integrally with said body and each providing a first portion located adjacent to said body and having a diameter substantially greater than the diameter of each workpiece aperture, and a second portion located contiguous to the first and having a diameter smaller than the diameter of the workpiece aperture, each stud being adapted to be pulled through one of the workpiece apertures in response to axial elongation, for placing the workpiece upon the first portion and being retained in that position by the circumferential compression exerted therebetween.

2. A vibration isolating mount according to claim 1, wherein said first portion provides a circumferential retaining bead on each side of the workpiece, the beads of said first portion constituting substantially all of the material which becomes displaced when the workpiece is placed upon the first portion.

3. A vibration isolating mount according to claim 1, wherein said first portion is tapered axially toward said second portion.

4. A vibration isolating mount according to claim 1, wherein said ring-like body of resilient material is provided with a boss having a flat base plane passing approximately through the line of tangency of the outer periphery of the annular body and being adapted for abutting a workpiece.

5. A vibration isolating mount according to claim 1, wherein said body is composed of a relatively soft rubber-like material and said studs are composed of comparatively hard rubber-like material.

6. A vibration isolating mounting according to claim 2, wherein said body is composed of a relatively soft rubber-like material and said studs are composed of comparatively hard rubber-like material.

References Cited

UNITED STATES PATENTS

| 2,209,403 | 7/1940 | Kittner et al. | 18—59 |
| 2,453,991 | 11/1948 | Kaemmerling | 248—358 |
| 2,645,340 | 7/1953 | Dow | 206—80 |
| 2,995,328 | 8/1961 | Whitted | 248—71 |
| 3,053,046 | 9/1962 | Fleming | 248—358 |
| 3,197,164 | 7/1965 | Hansen | 248—73 |

FOREIGN PATENTS

| 67,926 | 10/1957 | France. |
| 1,106,122 | 5/1961 | Germany. |
| 599,050 | 3/1948 | Great Britain. |
| 658,898 | 10/1951 | Great Britain. |
| 852,546 | 10/1960 | Great Britain. |

CHANCELLOR E. HARRIS, *Primary Examiner.*

CLAUDE A. LE ROY, *Examiner.*